United States Patent [19]
McLean et al.

[11] Patent Number: 5,095,302
[45] Date of Patent: Mar. 10, 1992

[54] THREE DIMENSIONAL MOUSE VIA FINGER RING OR CAVITY

[75] Inventors: James G. McLean, Boyton Beach, Fla.; Clifford A. Pickover, Yorktown Heights, N.Y.; Alvin R. Reed, Cary, N.C.

[73] Assignee: International Business Machines Corporation, Armonk, N.Y.

[21] Appl. No.: 368,485

[22] Filed: Jun. 19, 1989

[51] Int. Cl.$^5$ .............................................. G09G 3/02
[52] U.S. Cl. .................................... 340/710; 340/706
[58] Field of Search ............... 340/706, 709, 710, 712; 200/52 R, 329, 5 R; 341/20, 23; 364/200, 900, 190

[56] References Cited

U.S. PATENT DOCUMENTS

| | | | |
|---|---|---|---|
| 3,860,771 | 1/1975 | Lynn et al. | 200/329 |
| 4,065,650 | 12/1977 | Lou | 200/5 R |
| 4,105,885 | 8/1978 | Orenstein | 200/52 R |
| 4,313,113 | 1/1982 | Thornburg | 340/709 |
| 4,493,219 | 1/1985 | Sharp et al. | 341/20 |
| 4,700,176 | 10/1987 | Adler | 340/712 |
| 4,736,191 | 4/1988 | Matzke et al. | 340/710 |
| 4,835,528 | 5/1989 | Flinchbaugh | 340/709 |
| 4,879,556 | 11/1989 | Duimel | 340/709 |

FOREIGN PATENT DOCUMENTS

| | | | |
|---|---|---|---|
| 0000828 | 1/1986 | Japan | 340/709 |
| 0004166 | 7/1986 | World Int. Prop. O. | 340/709 |

OTHER PUBLICATIONS

Fox, "Keyboard Scanned Capacitive Joy Stick Cursor Control", IBM Technical Disclosure, vol. 23, No. 8, Jan. 1981, pp. 3831-3834.

Cummings, "Transparent Keyless Keyboard for Variable Terminal Applications", IBM Technical Disclosure, vol. 20, No. 4, Sep. 1977, pp. 1609-1611.

*Primary Examiner*—Jin F. Ng
*Assistant Examiner*—Dov Popovici
*Attorney, Agent, or Firm*—Roy R. Schlemmer

[57] ABSTRACT

A cursor control/data input device for a computer display system which utilizes a conventional X-Y mouse provided with a third Z with axis data generating mechanism. The mouse may be used with any non-specific support surface and would have conventional X-Y data generating wheels or a rotating ball with appropriate pick-up elements to generate the X-Y coordinate data. Third, or Z, coordinate data is produced by a third instrumentality in the mouse body, preferably operable by the operator's thumb or index finger. Means comprising a pressure sensitive button mounted on the surface of the mouse, or alternatively means actuated by the insertion of the operator's finger into a hole provided in the mouse's body, generate said Z coordinate data. Movement of the finger in the hole is measurable by any of a number of different instrumentalities.

4 Claims, 3 Drawing Sheets

THREE DIMENSIONAL MOUSE VIA FINGER RING OR CAVITY

FIELD OF THE INVENTION

The present invention relates to the field of electro-mechanical data input devices for communicating with video display systems and the like, and particularly to such data input devices where the control of a cursor and/or pointer on the screen of the display is able to respond to three input dimensions.

BACKGROUND OF THE INVENTION

Data input or communication from a user to a computer is possible using many different known input devices. The most common is a typewriter-type keyboard which is coupled directly into the computer system. As will be well understood, computer systems conventionally include a display device of some sort normally of the CRT monitor type which is capable of displaying on the screen any information, be it graphical or text, being currently examined or input by an operator. The monitor is also the usual vehicle allowing a visual display of the communication between the operator and the system. A display is also frequently used to generate graphics together with suitable data input devices and the display is the usual mechanism by which the operator is able to relate interactively with the computer by suitably manipulating data or graphic images on the screen. The usual way in which the user/operator actively interacts with the computer is to move a cursor or pointer selectively on the display screen where the movement may either comprise raw data input or may indicate certain sections of the display which has significance to the task being performed by the operator.

Many types of devices have been developed and are currently known in the industry which allow a user/operator to selectively move the cursor spot on the display screen. These include cursor keys on the keyboard which move the display cursor orthogonally, i.e., along X or Y axis, light pens, joy sticks, and various types of mouses whose X—Y axis motion may be detected and conveyed to the system where the X—Y motion data is converted into cursor movement. Thus, the movements of the user/operator's hand are translated by the input devices into positional coordinate information or commands which the computer is able to interpret and utilize same to move the cursor appropriately.

For most applications, moving the cursor conventionally in the X-Y direction is adequate since the screen is two-dimensional and many applications require only two dimensions. However, for certain applications it is desirable to have a third input dimension or Z axis movement which can, with appropriate software support, very conveniently allow the operator to, for example: pick a particular location within a three dimensional isometric graphical display or select a particular menu in a three dimensional menu display as is well known in the art.

Other major applications might be to control an image "zoom" function (to magnify or de-magnify an object) or to translate an object.

The device is not limited to 3D selection or picking. It can be also used to translate or magnify an object or image. For example, the user may display a 3D molecular graphic, or an image of the ground from an airplane. The new control mechanism can allow the user to magnify the molecular model or the image. Alternatively, the third dimensional control can be used to translate a model in a direction orthogonal to the standard 2D screen directions.

It would also be possible for the 3rd dimensional input means to control other graphic features, such as color, intensity, etc.

There are no known mouse designs currently on the commercial market allowing for the inputting of third i.e. Z, dimension data via a mouse type of cursor control device. It's obviously to the advantage of the mouse design that the particular mechanism for introducing the Z dimension be natural i.e., be intuitive and be easily implementable electronically to introduce said third dimension into the display system. It is believed that the present three-dimensional mouse satisfies these requirements.

Prior Art

U.S. Pat. No. 4,736,191 of Matzke et al., entitled: "Touch Activated Control Method and Apparatus" discloses a very complex cursor control device comprising a touch-pad formed of a plurality of individual conductive plates formed in a predetermined arrangement. A user's touch is detected via a change of capacitance in certain areas of the plate resulting from the user's finger or hand on the pad. A relatively complex circuit arrangement is required for detecting which portion of the pad has been touched by the user and X-Y coordinates are determined primarily as a function of the portion of the pad touch and the Z coordinate is developed as a function of the total area touched.

The present invention relates to a conventional X-Y mouse input/cursor control device augmented by the addition of a third sensing element built into the mouse body which basically senses movement or pressure applied by the thumb or index fingers. It may also be utilized with existing (X-Y) display system architecture with minimum modification.

In an article entitled: "Keyboard Scanned Capacitive Joystick Cursor Control" by J. E. Fox appearing in the IBM Technical Disclosure Bulletin Volume 23, Number 8, January 1981, pages 3831 thru 3834 discloses a joystick cursor controller which, similar to the Matzke et al. patent, utilizes a change of capacitance which is picked-up by the sensing circuitry that translates into X-Y movement of the cursor. Although, a measurement of change of capacitance is one way in which the present three-dimensional mouse could generate the Z coordinate data, the particular way in which capacitance is measured in the above article has little resemblance to the structure or function of the subject invention.

The art is, of course, replete with various types of X-Y mouse input mechanism, however, none is known to the inventors which provide for the inputting of Z coordinate data.

SUMMARY AND OBJECTS

It is a primary object of the present invention to provide a three-dimensional mouse input/cursor control device capable of generating data in the X, Y and Z dimensions.

It is a further object of the invention to provide such a mouse which is both convenient and intuitive for the operator to provide the Z dimension data.

It is another object to provide such a mouse wherein the Z dimension input is a function of pressure or movement of the thumb or one of the fingers of the operator on the mouse's body.

It is yet another object to provide such a mouse wherein the means for generating Z input data comprises an opening in the mouse's body into which an operator's finger may be inserted, the magnitude of the signal being proportional to the degree of insertion.

The objects of the present invention are accomplished in general by a mouse cursor control input system for a computer display system or the like having conventional X, Y motion pick up means mounted in the mouse's body. The improvement of the present invention comprises providing a third or Z dimension input signal generating means in the mouse's body which is easily activated by pressure on or movement relative to the mouse's body by the thumb or one of the fingers of the operator.

In the preferred embodiment of the invention a hole or finger cavity is provided in the mouse's body into which a finger may be readily inserted, and the depth of penetration detected by suitable means as an indication of the Z dimension signal magnitude.

DESCRIPTION OF THE PREFERRED EMBODIMENT

Figure 1:
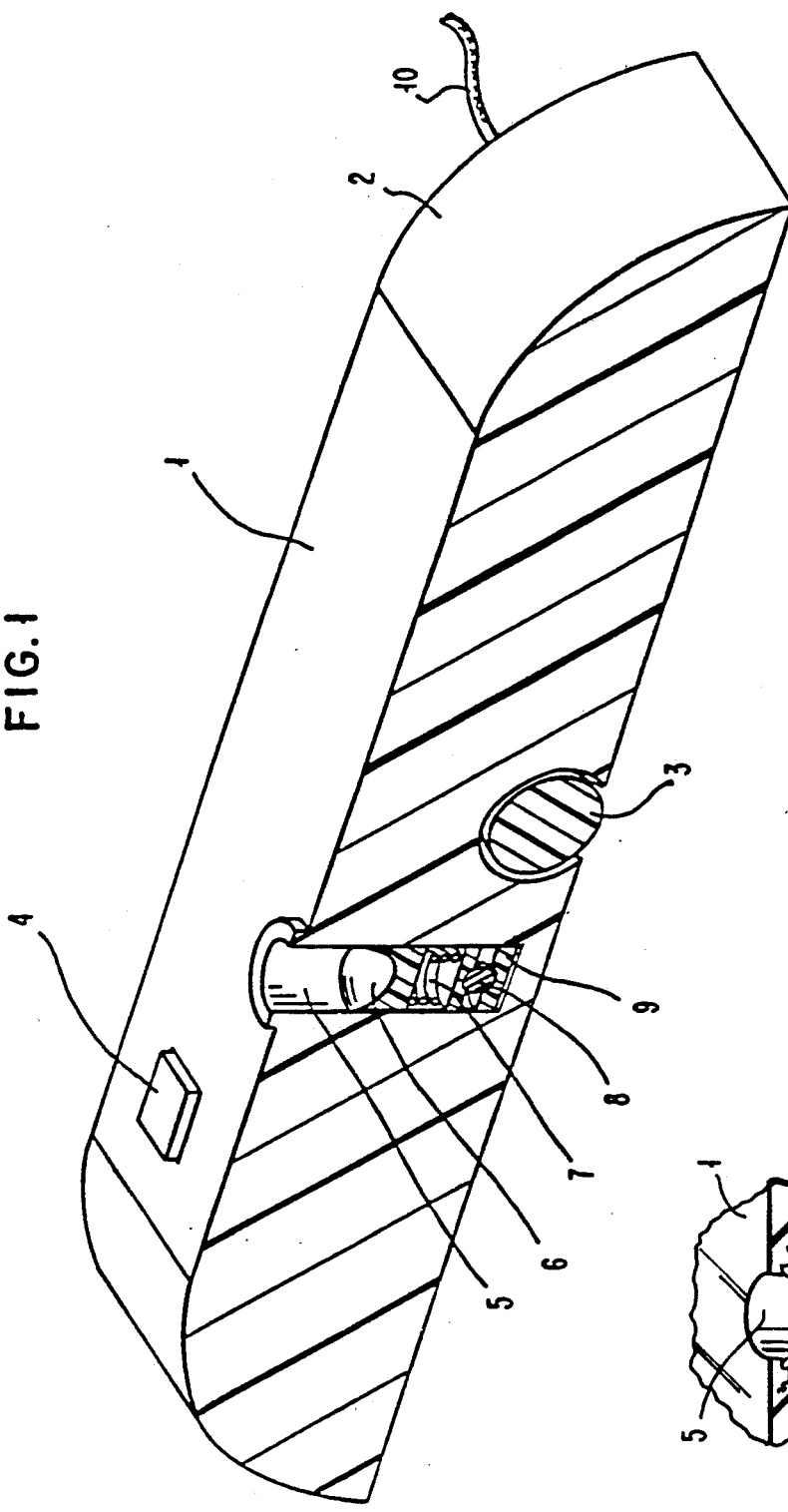
FIG. 1 comprises a cross-sectional isometric view of a preferred embodiment of a three-dimensional mouse constructed in accordance with the teachings of the present invention.
Figure 4:
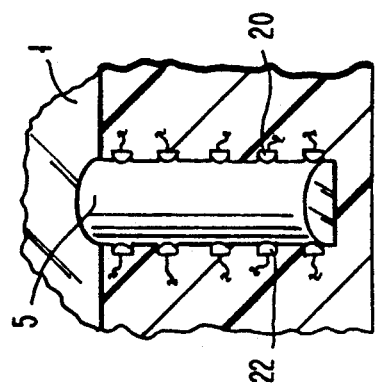
FIG. 4 comprises a series of light source/photo detector pairs located on opposite sides throughout the length of the hole.

Display system input mice have proven to be effective and intuitive pointing devices for applications requiring one dimensional movement up and down thru a menu list or for two dimensional movement around the screen under a "paint" program's control. However, movement control in three dimensions has heretofore been limited to complex and non-intuitive approaches as in the Matzke et al. patent referenced previously. The present invention extends the intuitive mouse approach into the third dimension.

In the following description of the invention several embodiments of a three dimensional mouse will be set forth and discussed. All of the embodiments are simple and yet effective in providing a third input dimension which is both physically easy to use and intuitive on the part of the user.

The first involves using a piezoelectric pressure transducer (PPT) which is added to an otherwise conventional mouse design to provide the capability for natural and intuitive pointing in three dimensions.

In the second, an elongated ring is added to the mouse's body into which a finger is inserted. The ring may resemble a standard finger-ring worn on a person's hand. However, for the present invention, the ring is attached to a vertical post which is adapted to move axially into or out of the mouse. In other words, the ring may protrude above the mouse by half a centimeter. Movement of the ring up or down may be detected.

The ring would be attached to a string which is wound around the shaft of a potentiometer. Raising the ring causes the potentiometer to turn, varying the resistance of the pot. This change in resistance would be detected by the mouse circuitry. The pot shaft is spring loaded to automatically return to a default position. Thus, movement of the ring can be used to indicate a third dimension for graphics purposes. This is better than a simple pressure pad, because up and down movements are easily and intuitively mapped to a coordinate which is, of course, a more natural motion for the user or operator than merely maintaining pressure.

In yet, another embodiment a hole is placed in the middle of the mouse's body into which one inserts e.g., the index finger. The depth of penetration may be measured by a number of different means. Optical means could be employed wherein a plurality of a light emitting diodes (LED) and associated photo-detectors, e.g., photo-conductors (PC) located on opposite sides of the hole would be capable of measuring said depth of penetration.

A further means for measuring depth of penetration could utilize a piezoelectric pressure transducer (PPT) at the bottom of the hole which will be described subsequently.

In the previously described PPT embodiment the PPT is utilized to measure pressure of the mouse body into the support surface. As is well known, a PPT is a solid state device for converting pressure applied thereto into a corresponding electrical voltage more or less proportional to the amount of pressure applied. PPT's are found most often in transistorized scales and other measuring equipment, and are capable of very sensitive pressure detection. In this embodiment the PPT would be placed in the lower portion of an otherwise conventional optical or rolling-ball mouse, separated from the ball by a compressed felt pad. The X-Y axes of movement are controlled in the normal mouse manner. "Pointing" in the Z axis is accomplished by applying pressure to the mouse more or less perpendicular to the surface on which the mouse is moving which translates into pressure on the PPT.

Circuitry within the mouse converts the voltage received from the PPT to signals indicating Z dimension data which are relayed to the display system along with the other mouse movement signals representing motion in the X-Y dimensions.

The PPT circuit combination is calibrated so that excessive pressure, which might prevent easy X-Y movements is not required, but that normal hand pressure does not cause signals representing Z movements to be generated. Thus, a simple upper and lower treshold would be provided.

The concept of moving a cursor or other pointer on the screen in the X-Y dimension while "pushing" it into the Z dimension is intuitively comfortable. Intuitive, as used herein, refers to the natural mental-physical reaction of the user to perceive the need for and achieve such Z access movement easily and automatically. Normally, it is difficult for a person to even think in the Z dimension, much less perform a third-dimensional hand movement, especially, while working on a two dimensional surface. It is, further, necessary that this Z directional movement be carefully controlled to appropriately move the cursor, as will be well understood. With all of the disclosed embodiments of the present invention, this same intuitive feel is maintained.

In certain situations, pushing down on the entire mouse could affect control over the normal X-Y movements of the mouse. For these situations it is proposed that an alternate implementation be utilized in which the PPT is included in the form of a non-moving "button" on the side of the mouse (instead of being mounted on the bottom of the mouse for contact with the surface). In this case the thumb is used to press the button with varying degree of force as the mouse is moved across a support surface in the normal manner. In this implementation finer control of the cursor movement would be possible, at the expense, however, of being slightly less intuitive.

A preferred embodiment of the present invention utilizes a hole in the middle of the mouse's body into which one may insert for example: the index finger. The depth of penetration of the finger may be measured as described above, by LED/PC sensor pairs located along the hole on opposite sides thereof or some sort of capacitive or acoustic sensing method could be utilized. This embodiment is believed to be a preferred one because it is easier to maintain a steady finger depth of penetration in the hole (a constant Z dimension signal) while moving concurrently into the X-Y dimension than with the two previously described pressure button embodiments.

An advantage of the presently disclosed three-dimensional mouse is its compatibility with all existing software products requiring mouse X-Y signals. In this situation the Z axis or dimension signals would simply be ignored for those applications needing only the traditional X-Y mouse control of the cursor.

Examples of the types of existing software application where the three-dimensional mouse might be useful are as follows. In three-dimensional drawing programs such as CADAM systems such a mouse may be used to design three-dimensional objects, usually the designer is restricted to one two-dimensional view at a time. The three-dimensional mouse allows access to all three dimensions at all times.

A second use might be in a layered menu system. In this case the mouse cursor moves "into" a screen of menu category "tiles". The cursor is placed above one of these tiles at a pre-determined position and "pushed down" or moved "inward" through a selection of options under that category. When the desired tile is reached, an appropriate button on the mouse is pressed to indicate that the current option is being selected. Unlike hierarchical menu systems, all categories are visible and all selections are available from the same screen.

A further use would be for multiple parameter control other than X-Y-Z spatial dimensions. Adding another dimension of control will always be useful in situations when the computer provides a real-time control signals, such as "waldo" control, full sound parameter control of an electronic musical system, or control of a lighting system or the like.

Waldo as used herein is a generic term for a remote-controlled mechanical unit which mimics a human capacity. For instance, waldoes in the form of mechanical arms and hands might be used inside a nuclear reactor unit and could be controlled by the 3-D mouse of the present invention providing data input to computer controlled manipulating circuitry.

It is believed that many other uses for a third dimension with such a mouse control system are possible. If such a device becomes commercially available, it is believed that developers of current mouse-friendly software systems would come up with innumerable additional uses for such systems.

The preferred embodiment of the invention will now be set forth and described with reference to the figures. In FIG. 1 a three-dimensional control mouse constructed in accordance with the teachings of the present invention is shown in perspective along a cross-sectional plane taken through the middle of the mouse's body. The left half of the mouse has been removed for visualization. This unit allows the user to input three distinct analog signals to a utilization display system or the like. Two of the analog signals are the typical X and Y values or dimensions of the mouse movement. The third analog signal is the Z dimension and is applied by the method and instrumentality described subsequently.

The figure is functional in nature and only shows details particularly relating to the present invention. Thus, the main body (1) of the mouse contains all of the necessary means for generating and picking-up X and Y signals as a well as the specifically shown instrumentality for generating the Z signal. The body also provides an attachment for the cabling (10) which provides power leads as well as signal leads back to the host system as will be well understood. In use, the user would rest his palm on the front radius (2) of the mouse's body to control the movement of the mouse as in any conventional X-Y mouse. The roller ball (3) is spherical and produces the X and Y analog signals by suitable means well known in the art. One or more standard control buttons (4) are provided for controlling certain mouse functions as will also be well understood.

According to the teachings of the present invention, a finger cavity or hole (5) is provided to produce and control the Z analog signal. The user places his finger in the cavity against the finger button (6). When the user presses on the finger button the spring (7) is compressed.

The compression of the spring is used to control the analog measuring device. This spring presses a rubber ball (8) against a surface acoustic wave (SAW) device (9) which is capable of providing a reliable variable input. In such a device surface acoustic waves with frequencies in the range of 7-10 Hz propagate nondispersively along and are bound to solid surfaces. When the rubber ball presses against the surface, it attenuates the wave burst propagating across the surface. The SAW device generates an output signal whose magnitude is dependant upon and proportional to the amount of area the rubber ball covers. This is controlled in turn by the amount of pressure from the user's finger. The degree of deformation of the ball provides a uniform, accurate measure of pressure and changes in pressure to, in turn, produce an analog signal approximately proportional to the pressure applied. The SAW technique allows an accurate analog output in a small, inexpensive device. It is important that it does not require a large range of motion for actuation over its entire output range.

As will be apparent, other obvious means may be utilized for measuring the depth of penetration or motion of the finger into the cavity such as the previously mentioned optical means wherein, for example, a series of optical emitter/detector pairs could be placed on opposite sides of the hole and, depending upon how many light beams were interrupted, an accurate measurement of the range of motion of the finger is readily possible.

Another way of measuring depth of penetration comprises using an electromagnetic coil imbedded around the cavity in the mouse to use with a metallic finger ring. The movement of the metallic finger ring through the coil would give the Z output. This output would be analog for a continuous coil or binary, similar to the X and Y output, if stacked coils are used.

As will be apparent to those skilled in the art, still other means can readily be used to produce an analog signal based on the position of the finger button. The contribution of the present invention involves the recognition of the importance of a third or Z dimension input signal and the provision of means on the mouse's body to produce such a signal, said means being intuitive on the part of the user.

The three-dimensional mouse of the present invention thus has as its primary advantage the availability of an additional analog control input to the application software which it provides when utilized in conjunction therewith. The user does not need to control a separate device to achieve this third control parameter.

Figure 2:
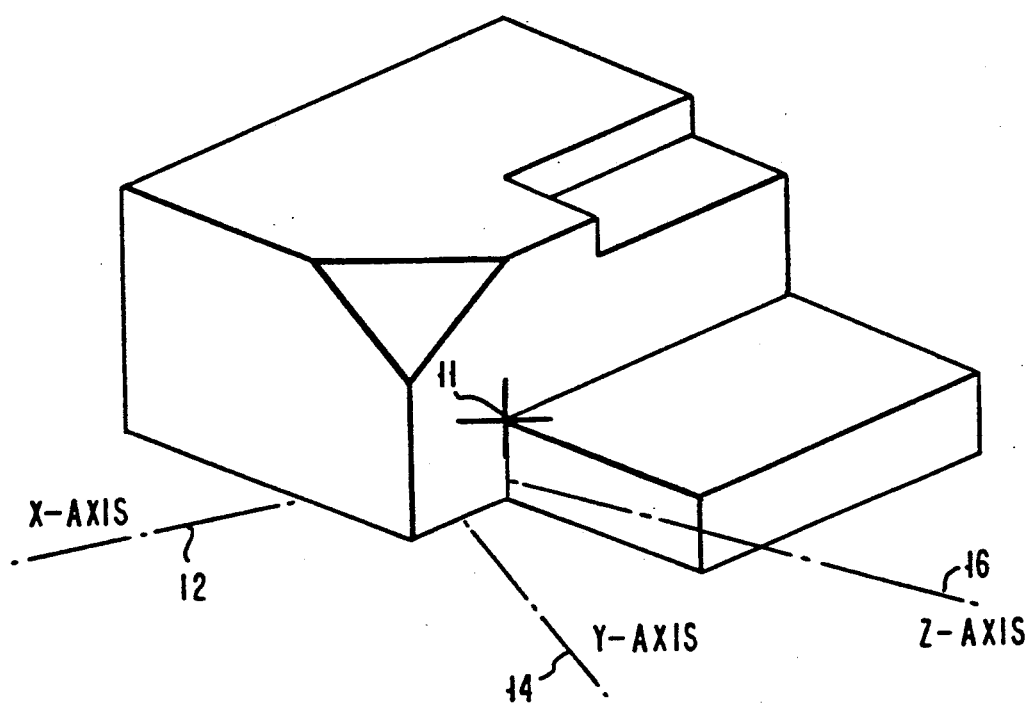
FIG. 2 comprises graphical representation of a three-dimensional body upon a display screen illustrating the use of the X, Y and Z coordinates to locate a cursor in all three dimensions.

FIG. 2 illustrates a three-dimensional object being drawn on a computer screen. The X, Y and Z coordinate of each intersection point on the object is being dynamically determined by the three-dimensional mouse.

The current position (10) of the cursor denoted by the large cross (+) symbol, is defined by an X offset (12) along the X axis, a Y offset (14) along the Y axis and a Z offset (16) along the Z axis. The X and Y offsets are produced by the standard rolling ball located on the bottom of the mouse. The Z offset capability is produced by utilizing one of the Z dimension input means included in the mouse's body in accordance with the teaching of the present invention such for example as the hole and pressure transducer in the embodiment illustrated in FIG. 1.

Figure 3:
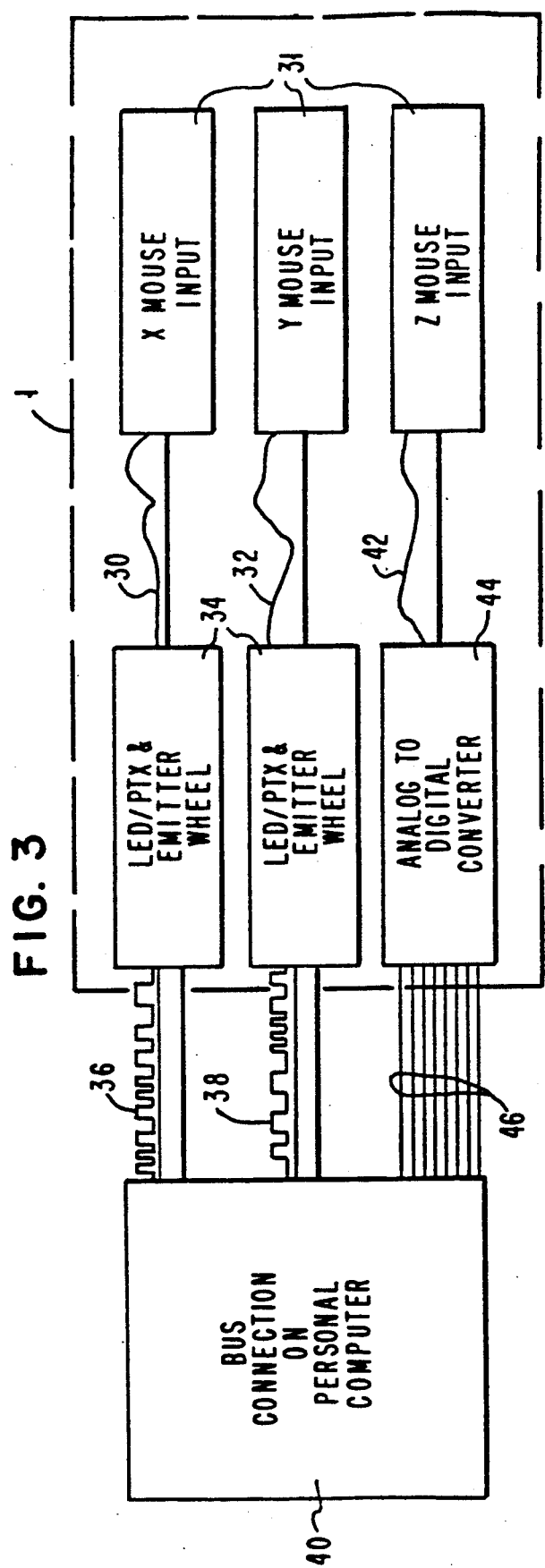
FIG. 3 comprises a high level functional block diagram illustrating how the X, Y and Z inputs generated by movement of the mouse are transmitted to the inputs of a personal computer for controlling a cursor movement on the display screen.

The functional block diagram of FIG. 3 is illustrative of typical instrumentalities within or associated with the mouse body which produce the three-dimensional X, Y and Z inputs, converts them to appropriate electrical signals which are then fed to a utilization display system such as a personal computer. In the figure the dotted line designated (1) comprises functional units which could readily be included in the mouse's body. In this figure it is assumed that the X and Y inputs as well as the signal generating circuitry is conventional in nature.

The three blocks 31 marked X, Y and Z mouse input are representative of the motion of the mouse, caused by movement thereof by a user, which motion has been appropriately broken into X, Y and Z dimension signals. The X and Y dimension input signals would be derived as the motion of X and Y motion pick-up wheels attached to the spherical ball in the embodiment of FIG. 1 and the Z signal would be derived from one of the pick-up means described previously.

Each of the X and Y physical inputs to the mouse introduces an analog rotary motion in a movable sphere having both X and Y motion take-off wheels such as are known in the art. These wheels produce the X and Y analog output wave forms or signals 30 and 32. This rotary motion may be utilized to turn a notched emitter wheel which switches a light emitting diode/phototransistor (LED/PTX) on and off in a proportional binary manner. The output signals 36 and 38 from the LED/PTX blocks 34 are illustrated as a variable square wave which is in turn connected to X and Y positions on the input bus to the personal computer 40. As will be well understood by those skilled in the art, analog to digital conversion means can also be included in the blocks 34 to produce binary signals representative of the analog waves 30 and 32. These signals comprise a sequence of binary values representing the repetitive sampling of the analog signal as will also be well understood by those skilled in the art.

The third mouse input referred to herein as the Z axis input is provided by means of one of the instrumentalities set forth previously e.g., 1) a pressure sensitive device in conjunction with the main movement ball which measures pressure by the mouse on the surface, 2) the hole or cavity utilizing either an optical pick-up, a pressure sensitive pick-up or variable capacitance means, or 3) a pressure transducer on the side of the mouse engageable by the thumb. The specific manner of producing the Z signal is not important to this description. The electronic analog signal from the pick-up means (the Z mouse input on the figure shown as analog wave 42) is fed to the analog to digital converter 44. The analog to digital converter converts this signal as described above into a sequence or continuous sampling of the analog wave which is converted into 8 bit binary code which may be transmitted over the bus 46 to the utilization means 40. As will be well understood, the on-off state of the various lines of the bus define the sequential 8 bit values between 0 and 255 which is represented by the continuous analog of the Z mouse input coming from the mouse. It will, of course, be understood that the lines connecting the two blocks 34 to a utilization device 40 could also be 8 line cables similar to 46 if it were desired to replace the two blocks 34 with analog to digital converters such as block 44 utilized to process the Z mouse input.

Conclusions

A novel three-dimensional mouse structure has been described incorporating the principals of the present invention which not only provides for a third dimension or third input parameter, but also and more importantly, allows this input to be intuitive on the part of the user. It is believed that this inherent intuitive characteristic of the mouse will greatly enhance its utilization in future commercial products since a third or Z dimension criteria has significant value. The mouse is usable in unaltered form on standard two-dimensional input applications and can be, of course, utilized for special applications written to utilize said third Z dimension.

The design is simple and straightforward and can utilize any of a number of existing technologies to easily and inexpensively achieve the third-dimension input. Suitable application programs utilizing the third-dimension may be easily written to provide, even greater, user "friendliness" for the already widely accepted mouse input technology.

While certain preferred embodiments of the invention have been set forth and described, it will be appreciated that other obvious modifications to the mouse may be made by those skilled in the art to provide a third input dimension without departing from the spirit and scope of the invention as set forth in the claims.

We claim:

1. In a cursor control/data input mouse including a mouse body and first and second X-Y movement pickup means providing data signals indicative of the relative movement of the mouse across a planar surface in the X and Y directions, the improvement which comprises:

third means in said mouse body responsive to generate a signal representing a third input parameter by the user comprising a hole for receiving a user's finger and signal generating transducer means in said mouse body mounted in cooperative relationship with said hole responsive to measure the depth of penetration of a user's finger axially within said hole, wherein said finger is not necessary for movement of the mouse, and said third parameter is capable of representing a movement along a z dimension.

2. A cursor control/data input mouse as set forth in claim 1, wherein said signal generating transducer means comprises a pressure sensitive transducer located within said hole and resilient means operable in cooperation with a user's finger for proportionally increasing the pressure on the transducer as the user's finger is inserted further into said hole.

3. A cursor control/data input mouse as set forth in claim 1, wherein said signal generating transducer means comprises a series of light source/photo detector pairs located on opposite sides of said hole throughout the length thereof, and control means operative in conjunction therewith to measure the depth of penetration of a user's finger as a function of the number of photo detectors deactivated as the finger is inserted.

4. In a cursor control/data input mouse including a mouse body and first and second X-Y movement pickup means providing data signals indicative of the relative movement of the mouse across a planar surface in the X and Y directions, the improvement which comprises, third means in said mouse body responsive to generate a signal representing a third input parameter by the user, responsive to the substantially axial movement of one finger of a user, said finger not being necessary for the movement of the mouse, said third parameter being capable of representing a Z dimension, said third means comprising a hole in said mouse body for receiving a user's finger and signal generating transducer means in said mouse body mounted in cooperative relationship with said hole for measuring the depth of penetration of a user's finger axially within said hole, said signal generating transducer means comprising a surface acoustic wave (SAW) device located at the bottom of said hole and resilient means associated therewith mounted so that as a user's finger presses on said resilient means the area of contact between said resilient member and said SAW device increases thereby changing an output signal produced by said SAW device.

* * * * *